United States Patent [19]

Yabusaki et al.

[11] Patent Number: 5,408,229
[45] Date of Patent: Apr. 18, 1995

[54] PROGRAMMABLE CONTROLLER WHICH ALLOWS FOR REMOVAL OF THE I/O MODULES DURING AN ON-LINE MODE

[75] Inventors: Tatsumi Yabusaki; Toshimitsu Asai, both of Aichi, Japan

[73] Assignee: Mitsubishi Denki Kabushiki Kaisha, Tokyo, Japan

[21] Appl. No.: 24,951

[22] Filed: Mar. 2, 1993

[30] Foreign Application Priority Data

Mar. 2, 1992 [JP] Japan .................................. 4-044735

[51] Int. Cl.$^6$ .............................................. H04Q 1/00
[52] U.S. Cl. ............................. 340/825.5; 340/825.22; 340/825.52
[58] Field of Search ................ 340/835.08, 825.07, 340/825.06, 825.05, 825.52, 825.5, 825.22, 825 R; 364/200

[56] References Cited

U.S. PATENT DOCUMENTS

| | | | |
|---|---|---|---|
| 3,818,199 | 6/1974 | Grossmann et al. | |
| 4,638,313 | 1/1987 | Sherwood, Jr. et al. | 340/825.52 |
| 4,674,085 | 6/1987 | Aranguren et al. | 370/85.1 |
| 4,727,475 | 2/1988 | Kiremidjian | 340/825.08 |
| 4,730,251 | 3/1988 | Aokie et al. | 364/200 |
| 5,204,669 | 4/1993 | Dorfe et al. | 340/825.52 |

FOREIGN PATENT DOCUMENTS

| | | |
|---|---|---|
| 0426134 | 5/1991 | European Pat. Off. |
| 58-51326 | 3/1983 | Japan . |
| 8400829 | 3/1984 | WIPO . |

OTHER PUBLICATIONS

IBM Technical Disclosure Bulletin, vol. 29, No. 7, Dec. 1986, New York, U.S.A., pp. 2877-2878, "Circuits To Allow Cartridge Hot-Plugging".

*Primary Examiner*—Donald J. Yusko
*Assistant Examiner*—Edwin C. Holloway, III
*Attorney, Agent, or Firm*—Sughrue, Mion, Zinn, Macpeak & Seas; Richard C. Turner; Joseph Bach

[57] ABSTRACT

A programmable controller that allows input and output modules to be changed during an on-line mode with minimal interaction by the user. The controller includes a request table that separately stores change request signals generated by each module. In a first embodiment, the controller periodically polls this request table to determine whether any module has issued a change request. The controller disables each module that issues a change request. When a new module is loaded, the controller enables this module once the corresponding change request signal is removed from the request table. In a second embodiment, the controller uses an interrupt circuit to interrupt processing when a change request is initiated.

15 Claims, 12 Drawing Sheets

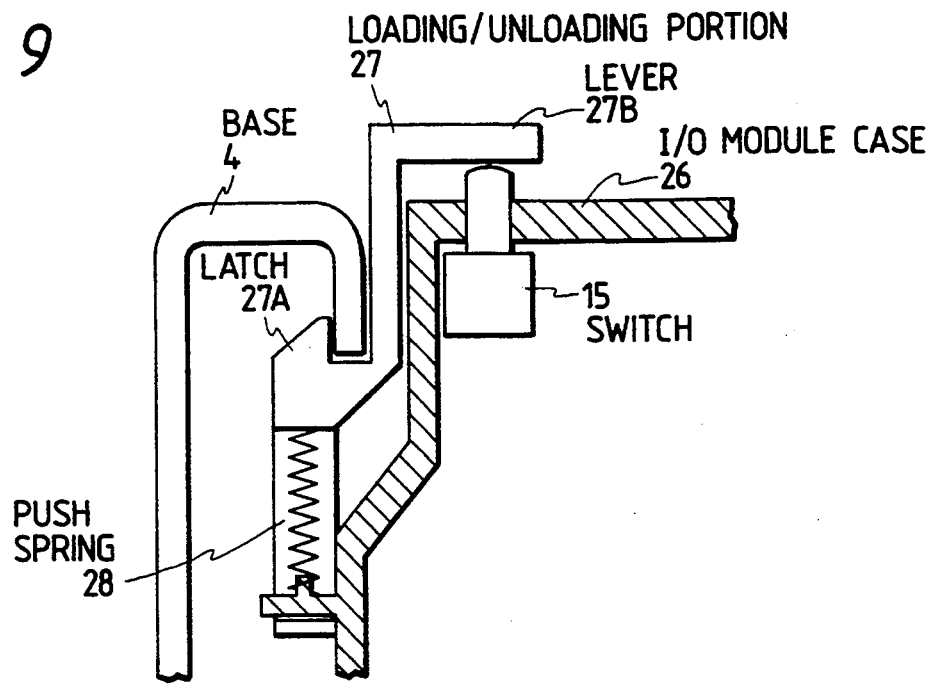
FIG. 9
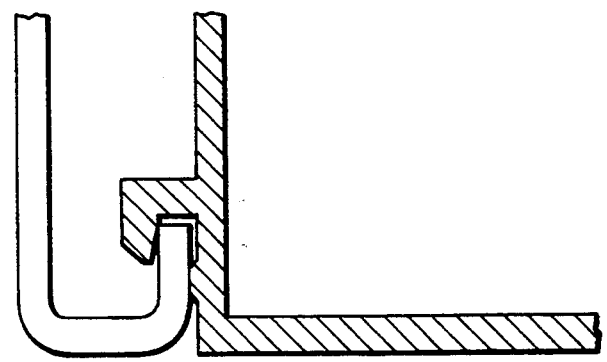
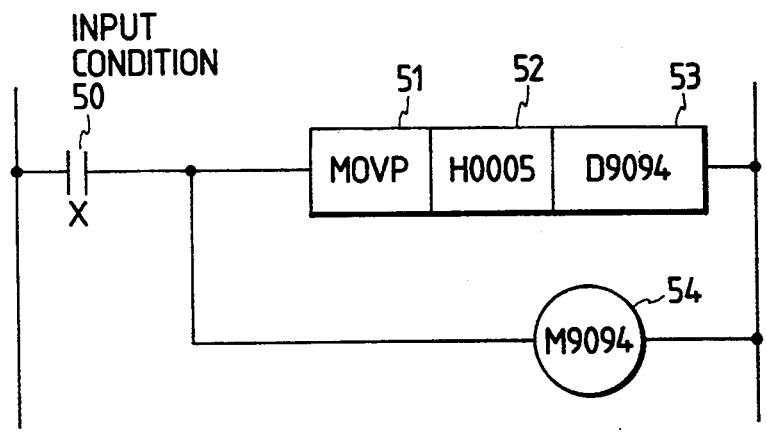
FIG. 12 PRIOR ART

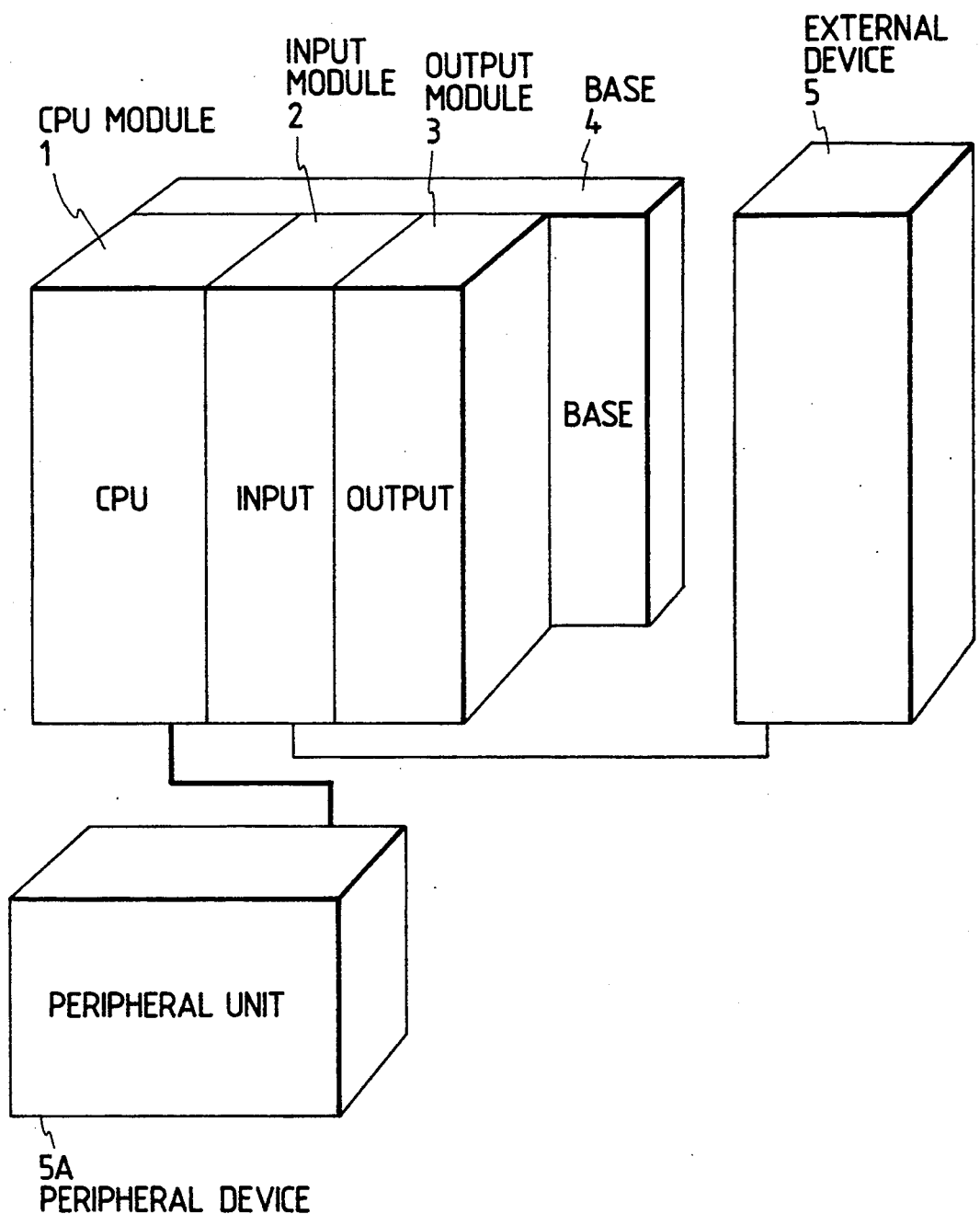

PROGRAMMABLE CONTROLLER WHICH ALLOWS FOR REMOVAL OF THE I/O MODULES DURING AN ON-LINE MODE

FIELD OF THE INVENTION

The present invention relates to a programmable controller which allows an input module and an output module to be loaded to and unloaded from a base unit while the unit is in an on-line mode.

BACKGROUND OF THE INVENTION

A conventional programmable controller offers an on-line module changing function, which is initiated by the user during the on-line mode when an input/output module connected with an external device becomes faulty. During this changing function, the controller does not switch to an off-line mode, but instead allows only the faulty module to be changed.

FIG. 10 illustrates the system configuration of a conventional programmable controller which offers the above noted on-line module changing function. As shown in FIG. 10, the system includes a CPU 1, an input module 2, an output module 3, a base unit 4 and an external device 5. The CPU module 1 controls input-/output signals from/to the input module 2 or the output module 3. The input module 2 inputs signals from the external device 5, and the output module 3 outputs signals to the external device 5. Hereinafter, modules 2 and 3 will be collectively referred to as the I/O modules.

The base unit 4 (hereinafter the "base") electrically connects the CPU module 1 and the I/O modules. The external device 5, which is connected to the I/O modules, serves as an object to be controlled, and may be, for example, a machining tool. The conventional system also includes a peripheral device 5A, which allows the user to create and transfer sequential programs to the CPU module 1. These programs identify and control the execution of sequential processing of the external device 5. The peripheral device 5A also allows the user to forcibly change a device's state (e.g., to assign input information X, output information Y and data information D) in the CPU module 1. The peripheral device 5A also allows a user to perform wiring checks and sequence program debugging. Thus, when a user wishes to change an I/O module while in the on-line mode, the user must use the peripheral device 5A to enter module changing information, including the identification of which I/O module the user intends to replace, as will be explained in more detail below.

FIG. 11 represents a block diagram illustrating a more detailed arrangement of the CPU module 1 and the I/O modules 2 and 3 in the conventional programmable controller of FIG. 10. The CPU 6 executes a sequence program and controls sequential processing of the external device 5. A module information table 7 contains information uniquely identifying each module. An input port 10 reads input signals transmitted from the input module 2 and transfers these signals onto a common bus. An input device memory 8 stores input signals transmitted from the input module 2 via the input port 10 as information. A save memory 9 temporarily saves the information stored in the input device memory 8.

An output device memory 11 stores output signals as information and an output port 12 transmits the output signals to the output module 3. Switches 13 and 14 enable and disable access to the input module 2 and the output module 3, respectively.

A ROM 19 stores the operating system that controls the operation of the CPU 6 and a working RAM 20. As shown in FIG. 11, the RAM 20 which includes the module information table 7 and the save memory 9, provides information to the CPU 6 during sequential processing. Device memory 21 includes the input device memory 8 and output device memory 11, and temporarily stores the most recent information read to and written from each input and output module while a module is being changed. The sequence program memory 22 stores the sequence programs written by the user which control the sequential processing.

FIG. 12 illustrates an exemplary sequence program entered by the user (via peripheral device 5A) to initiate a module changing function and to indicate which I/O module is to be replaced. The user enters this sequence during the on-line mode. Numeral 50 represents an input condition "X" and numeral 51 represents a transfer instruction "MOVP". A transfer data function (at point 52) identifies the specified number of a module to be changed. In this example, the value "H0005" represents a numerical value of 5. A predetermined word device 53 (illustrated by "D9094" in FIG. 12), that is concerned with the on-line module change, represents the transfer destination of the transfer data 52. A predetermined bit device 54 is represented by "M9094".

Thus, when a user intends to change a module, the user enters, via the peripheral device 5A, the transfer instruction 51, the number of the module to be replaced 52, the destination of the transfer data 53 and the bit device 54. Thereafter, the user turns ON the input condition 50 and the peripheral device 5A transmits the sequential program (FIG. 12) to the CPU 1.

FIG. 13 illustrates an on-line I/O module replacement processing flowchart for the programmable controller shown in FIG. 10. The on-line module changing procedure for the controller of FIG. 10 is described with references to FIGS. 11-12. In operation, the user initially writes the sequence program (FIG. 12) by using the peripheral device 5A, transfers the program to the CPU module 1, and causes the CPU module 1 to execute the sequence program by switching ON the input condition "X" 50. When the input condition "X" 50 is switched ON, the sequence program causes the specified module number to be stored in the predetermined word device.

In the example of FIG. 12, the module number "5" is stored in word device "D9094", thereby identifying the module to be changed. Next, the sequence program switches ON the predetermined bit device "M9094" 54. This causes the CPU module 1 to stop communicating with the I/O module 2 or 3, which corresponds to the number specified in the predetermined word device "D9094" 53, thereby allowing the corresponding I/O module to be changed. The user then removes the I/O module and installs a new I/O module 2 or 3 in the base 4. Once the user checks to ensure that the module has been completely installed, the user switches OFF the input condition "X" 50. Thereafter, the predetermined bit device "M9094" 54 is switched OFF and the CPU module 1 resumes normal control of new, i.e., changed I/O module 2 or 3.

As an alternative procedure, by employing the device forced-change function of the peripheral device 5A, the user may change the content of the predetermined word device "D9094" 53 into the specified number of the I/O module 2 or 3 and switches ON the predetermined bit device "M9094" 54. This causes the CPU module 1 to stop control of the I/O module 2 or 3 corresponding to the specified number, thereby allowing the corresponding module to be changed. Once the module has been changed, and the user switches OFF the predetermined bit device "M9094" 54, the CPU module 1 resumes normal control of the new I/O module 2 or 3.

Processing carried out for unit replacement in the CPU module 1 will now be described. In the on-line mode, the CPU 6 repeats sequence processing and programmable controller processing, other than sequence processing. The programmable controller processing is also referred to as end processing. The sequence processing represents processing carried out by the CPU 6 while under the control of the sequence program in the sequence program memory 9. During sequence processing, the contents of the input device memory 8 are monitored by the CPU 6 as necessary input information, and output information is stored in the output device memory 11.

End processing represents the processing segment during which the contents of the input port 10 and the input device memory 8 are ORed together. The results of this ORing operation are stored in the input device memory 8, in order to retain the contents of the input port 10 in the input device memory 8. The contents of the output device memory 11 are output to the output port 12.

End processing includes the processing segment, during which the CPU module 1 ceases communication with the I/O module 2 or 3 identified for replacement, in order to render it changeable. The flowchart shown in FIG. 13 is divided into left-hand side and right-hand side processing sequences. The left-hand side processing sequence includes steps S121–S125 and S130, and operates to stop communication with the I/O module 2 or 3 in order to make it changeable. The right-hand side processing sequence includes steps S126–S129 and operates to resume communication with the I/O module 2 or 3.

Processing is started in step S120, and in step S121 it is determined whether the predetermined bit device is ON or OFF. If it is ON, the prewritten module information table 7 is checked in step S122 to determine whether the module specified in the predetermined word device corresponds to the input or output module. If the specified module is the output module, then the program jumps to step S125, where the access enable switch 14 is opened. If the specified module is the input module, then the contents of the input device memory 8 are saved in the save memory 9 in step S123.

This saving operation ensures that once the module has been changed, the contents of the input device port may be restored to the contents before the change. If the specified module is the input module, the information of the real input port 10 and the contents of the input device memory 8 are ORed to reflect the information of the real input port 10 on the input device memory 8 and the results are stored into the input device memory 8 in step S124. The access enable switch 13 is opened in the step S125, and the processing is terminated in step 130.

When the access enable switch 13 or 14 is opened, I/O signals from/to the corresponding module are made invalid, and control is stopped. In the sequence processing of the CPU module 1, the states of the I/O devices thereof corresponding to the I/O modules 2 and 3 are processed by using only the information stored in the input device memory 8, and not by using the information of the input signals from the module. Output information is processed by employing only the information stored in the output device memory 11, and not by providing output signals to the module.

Once the module change has been made and it is determined in step S121 that the predetermined bit device is OFF, the specified access enable switch 13 or 14 is closed in step S126. Thereafter it is determined whether the corresponding module is the input module or the output module in step S127. If it is the input module, then the contents of the input device memory 8 saved in the save memory 9 are restored to the input device memory 8 in step S128. If it is the output module, then the contents of the output device memory 11 are output to the output port 12 in step S129, and the processing is terminated in step S130.

The programmable controller as configured above necessitates the use of the peripheral device 5A to change the predetermined device when I/O module replacement is made during the on-line mode. Further the user must know the specified I/O module number and the predetermined device word and device bit addresses before the user can initiate a replacement operation. These attendant limitations of the conventional system unduly complicate operation and increase the potential for error. In addition, the user is unable to determine when the I/O module has entered a changeable state and thus, the user may become anxious and/or doubtful about the I/O module replacement.

SUMMARY OF THE INVENTION

Accordingly, it is an object of the present invention to overcome the above disadvantages by providing a programmable controller which allows I/O modules to be replaced in an on-line mode without requiring a peripheral device.

It is a further object of the present invention to provide on-line module replacement even when a user does not know the number of the I/O module to be changed or the predetermined word and bit device addresses.

The first embodiment of the invention includes a programmable controller, in which the input module and/or the output module contain(s) module change request signal outputting means for outputting a module change request signal to a CPU module while in an on-line mode. The CPU module includes a change request data table for receiving and storing the module change request signals as data information. The CPU reads the module change request data information from the change request data table during the end processing period of a sequential processing program. The CPU performs processing upon the module that outputs the module change request signal to enable the module to be changed.

The second embodiment includes a programmable controller wherein the CPU module includes interrupt signal detecting means for detecting the module change request signal as an interrupt signal. The CPU processes data that is stored in I/O ports, buffers and memory that is associated with the module identified by the request signal, in order to prepare the identified module for removal. Thus, on-line module replacement is possible even if a user does not know the number of the module to be changed or the predetermined bit and word device addresses.

The third embodiment includes a programmable controller wherein the CPU module includes signal outputting means for outputting a module changeable state signal to that input or output module which generated a change request signal during the on-line mode. The state signal indicates that the designated module is "off-line" and is ready for removal. Each input and output module includes an indicator for indicating when a module is in a changeable state (i.e., "off-line") in response to the module changeable state signal. Thus the timing of module replacement while in the on-line mode can be judged and the module can be changed without mis-operation.

The fourth embodiment includes a highly reliable programmable controller wherein an input and/or output module includes a loading/unloading mechanism for engagement with the base unit. The loading/unloading mechanism includes switching means that acts as a module change request signal outputting means which is turned on/off by the operation of the loading/unloading mechanisms during loading and unloading. This switching system prevents the system from being adversely affected by accidental module loading/unloading.

BRIEF DESCRIPTION OF THE DRAWINGS

The above and other features and advantages of the present invention will be fully understood from the following drawings and detailed description thereof.

FIG. 9 is an sectional view of a loading/unloading mechanism of an I/O module in a programmable controller of the fourth embodiment.

FIG. 10 illustrates the system configuration of a conventional programmable controller.

FIG. 12 shows a sequence program example of I/O module replacement in an on-line mode of a conventional programmable controller.

DETAILED DESCRIPTION OF THE PREFERRED EMBODIMENTS

Figure 1:
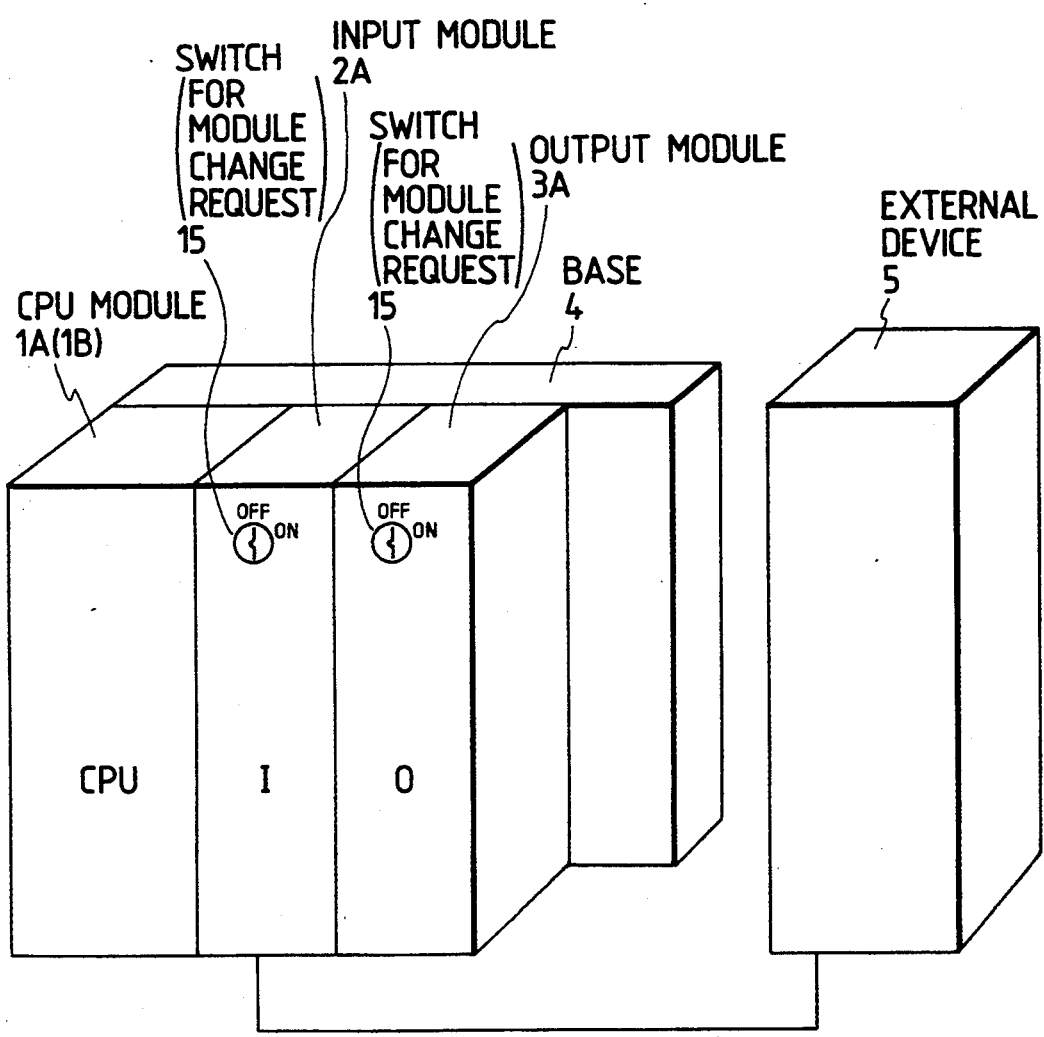
FIG. 1 illustrates the system configuration of a programmable controller of the first and second embodiments of the present invention.

A first embodiment of the invention will be described with reference to FIGS. 1 to 4, wherein reference numerals in FIGS. 1–4 which were previously defined in connection With corresponding parts of the conventional system will not be redefined hereafter in detail.

FIG. 1 illustrates the system configuration of a programmable controller which allows modules to be changed in an on-line mode. A CPU module 1A severs to control I/O signals from/to an external device 5, such as a controlled object. The CPU also allows an input module 2A and an output module 3A to be changed in the on-line mode in response to module change request signals input from the input module 2A and the output module 3A. Each of input and output modules 2A and 3A includes a switch 15 that functions as a module change request signal outputting means for outputting the module change request signal to the CPU module 1A.

Figure 2:
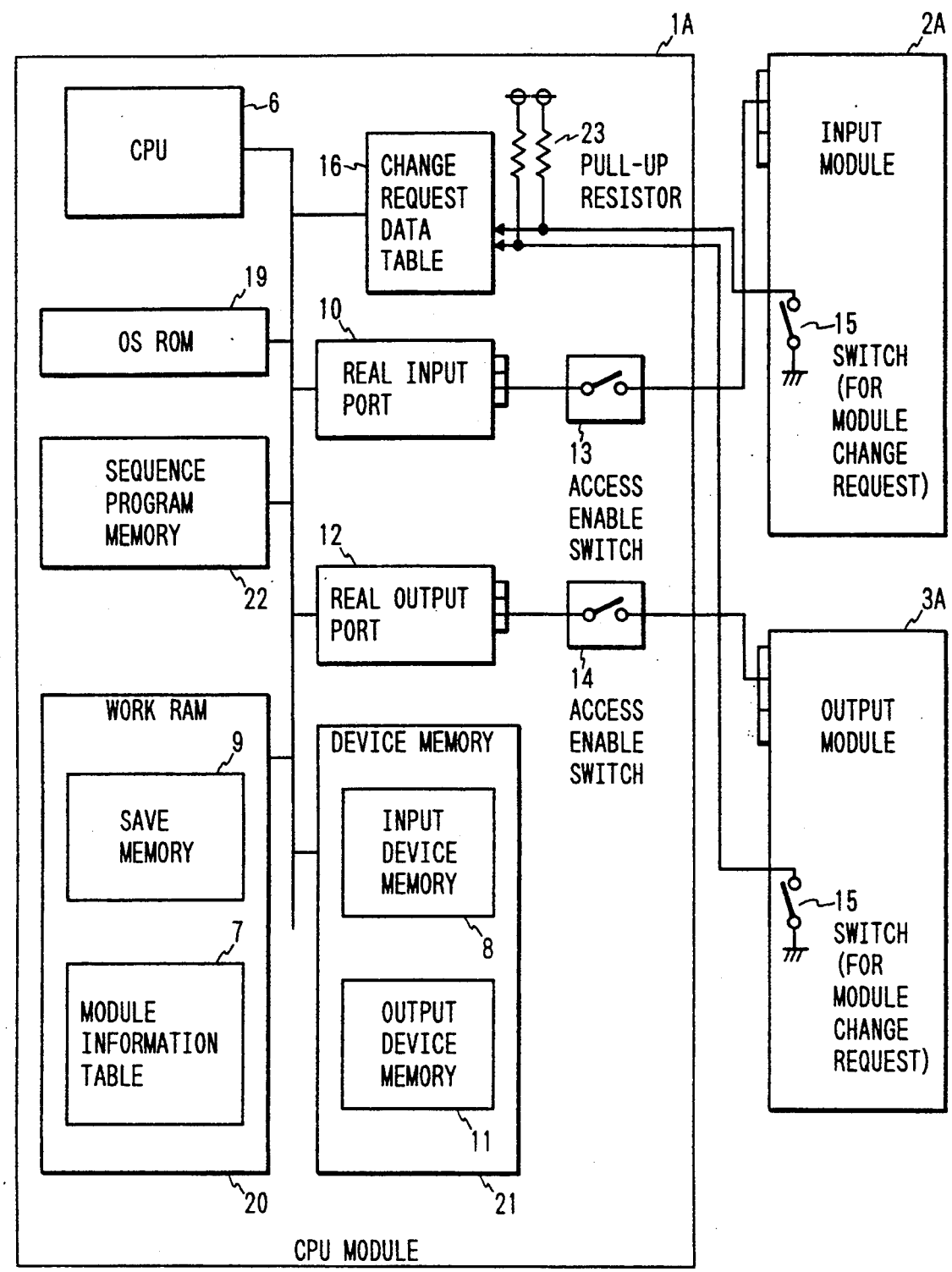
FIG. 2 is a block diagram illustrating the hardware arrangement of the programmable controller of the first embodiment.

FIG. 2 is a block diagram illustrating the hardware arrangement of the CPU module 1A, the input module 2A and the output module 3A in the programmable controller shown in FIG. 1. Switch 15 operates as the module change request signal outputting means for issuing a module change request when the switch is changed from a closed state (i.e., conductive) to an open state (i.e., non-conductive). During operation, when the switch 15 is opened the change request line changes from a low to a high state. The change request line is pulled to this high state by the corresponding pull-up resistor 23. This request signal is transmitted to, and stored in, a change request data table 16 as data. The change request data table represents a port or memory unit/table for separately receiving and storing each module change request signal.

Each I/O module is connected to the data table in such a manner that each request signal is uniquely addressed to a different location in the table. Each address stores a value indicating whether or not the corresponding module has issued a module change request signal. Thus, during operation when the CPU determines that an address in the request table contains a value indicating that a module has initiated a change request signal, the CPU is able to identify the module based on the location of the address at which the value is stored in the request table 16.

Figure 3:
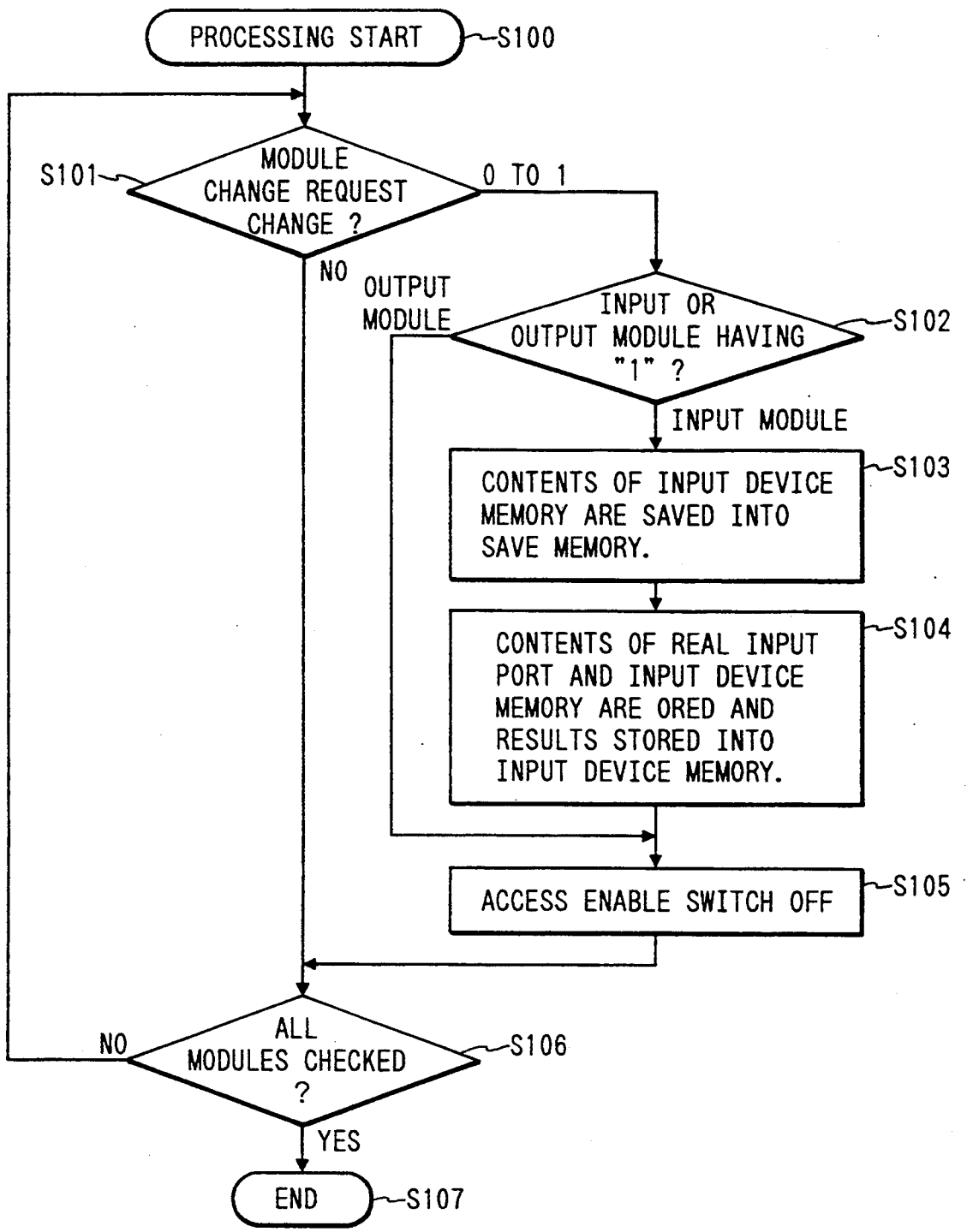
FIG. 3 is an I/O module change start-time processing flowchart for the programmable controller illustrated in FIG. 2.
Figure 4:
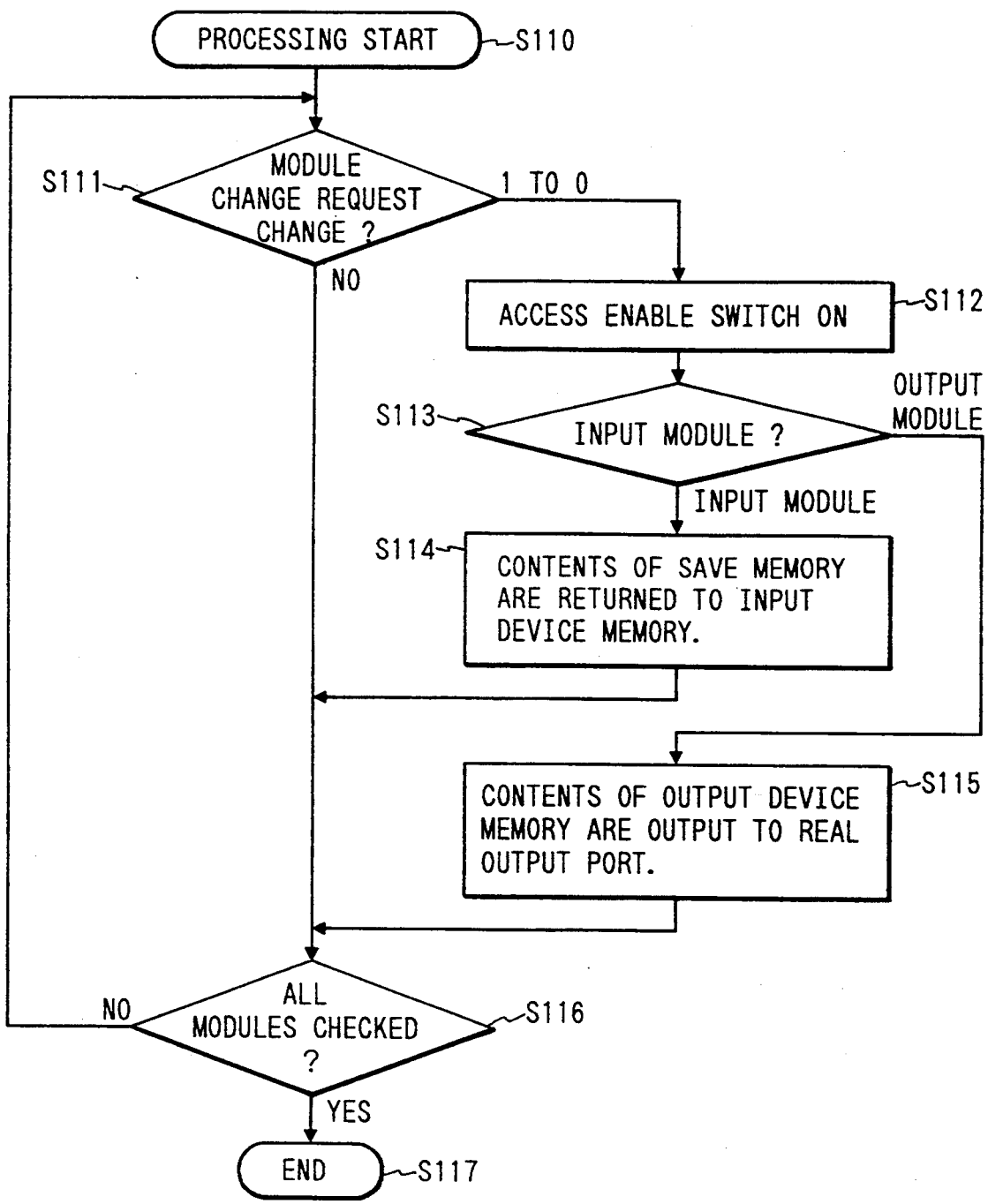
FIG. 4 is an I/O module change termination-time processing flowchart for the programmable controller illustrated in FIG. 2.

FIG. 3 is a change start-time processing flowchart for the programmable controller I/O modules 2A and 3A shown in FIG. 2. FIG. 3 illustrates the steps performed by the CPU to prepare an old module for removal. FIG. 4 is a change termination-time processing flowchart for the I/O modules 2A and 3A. FIG. 4 illustrates the steps performed by the CPU to initialize a new module before returning to normal control.

The operation of the present embodiment based on the arrangement shown in FIG. 2 will now be described. In the ordinary on-line mode the module change request switches 15 in the I/O modules 2A and 3A remain closed and continually transmit a "0" (or low state) to the CPU module 1A as module change request data (signals). In the on-line mode, a CPU 6 acting as a module change processing means continuously repeats end processing during each sequence process. The module change start-time processing shown in FIG. 3 and the module change termination-time processing shown in FIG. 4 are executed during the end processing interval.

The I/O module 2A or 3A is changed in the on-line mode by first opening the module change request switch 15 on the corresponding I/O module. This causes the I/O module 2A or 3A to transmit a "1" or high state to an address in the data request table 16, which corresponds to the module generating the request. The CPU reads the request data from the table 16.

During operation, the CPU module 1A initiates end processing periodically during the sequential processing. Particularly, during each end processing sequence the CPU initiates the module change start processing (step S100 of FIG. 3). First, the CPU 6 indirectly checks (step S101) the module change request data transmitted from each I/O module (2A and 3A) by reading the data stored in the data table 16. Once the CPU determines that the data at a particular location has changed from "0" to "1", the CPU 6 thereafter determines which I/O module corresponds to the request. The CPU identifies the module based on the port or memory address containing the request data (step S102). Next, the CPU opens the corresponding switch 13 or 14 according to the procedure outlined below to stop operation of the identified I/O module 2A or 3A, thereby rendering it changeable.

If the module to be changed is identified as the output module 3A in step S102, then the program jumps to step S105 and the corresponding access enable switch 14 is opened, thereby rendering further output signals to the output module 3A invalid. If the input module 2A is to be changed, the contents of an input device memory 8 are saved in the memory 9 (step S103). Next, the contents of a real input port 10 and the contents of an input device memory 8 are ORed together and the resultant ORed combination is stored in the input device memory 8 (step S104). This ORing operation ensures that any input information which has been accumulated in the real input port 10, but not yet transferred to the input device memory 8, will be stored in the device memory 8. Next, an access enable switch 13 is opened (step S105), thereby rendering further input signals to the input module 2A invalid.

The contents of the input device memory 8 are saved in the memory 9 (step S103) to enable the new module to be initialized after the old module is changed. When the switch 13 is opened (step S105), the CPU determines whether all of the modules have been examined (step S106). If all of the modules have not yet been examined (i.e., all of the request table locations have not been checked), then execution returns to step S101. If all of the table locations have been checked, then the change start-time process is terminated (step S107).

The programmable controller is designed such that once a particular I/O module 2A or 3A is removed, the corresponding pull-up resistor 23 retains a high state ("1") in the corresponding address of the request table 16.

Before the new I/O module 2A or 3A is installed, the change request switch 15 of the new module is opened. Thus, when the new I/O module 2A or 3A is properly attached to the base, the change request switch 15 is closed and normal control of the new module is resumed. Closing the switch 15 causes the new I/O module 2A or 3A to send a "0" or low state to the CPU module 1A as the change request data.

Once the change start-time processing of FIG. 3 is completed, the CPU performs the change termination-time processing of FIG. 4. When the CPU detects a change from a "1" to a "0" at a location in the change request data table (step S111), the CPU module 1A resumes normal control of the I/O module 2A or 3A. First, the CPU turns ON the access enable switch 13 or 14 (step S112) corresponding to that module identified in the data table location which has changed from a "1" state to a "0" state.

Next, the CPU determines whether or not the module to be changed is the input module 2A (step S113). If the changed module is the input module 2A, then the contents of the input device memory 8 stored in the memory 9 are written to the input device memory 8 (step S114). If the new module is the output module 3A, then the contents of an output device memory 11 are output to output port 12 in step S115. The above processing steps S110–S115 set the new module in the same condition as the old module immediately before removal in order to restart operation without fault. Next, the CPU determines (step S116) whether all of the modules have been tested for changes in the corresponding request data (i.e., if all of the addresses in the request table have been checked). If all the modules have not yet been checked, then execution returns to step S111 and the next request table location is tested. If all of the modules have been checked, then processing is terminated in step S117.

Figure 5:
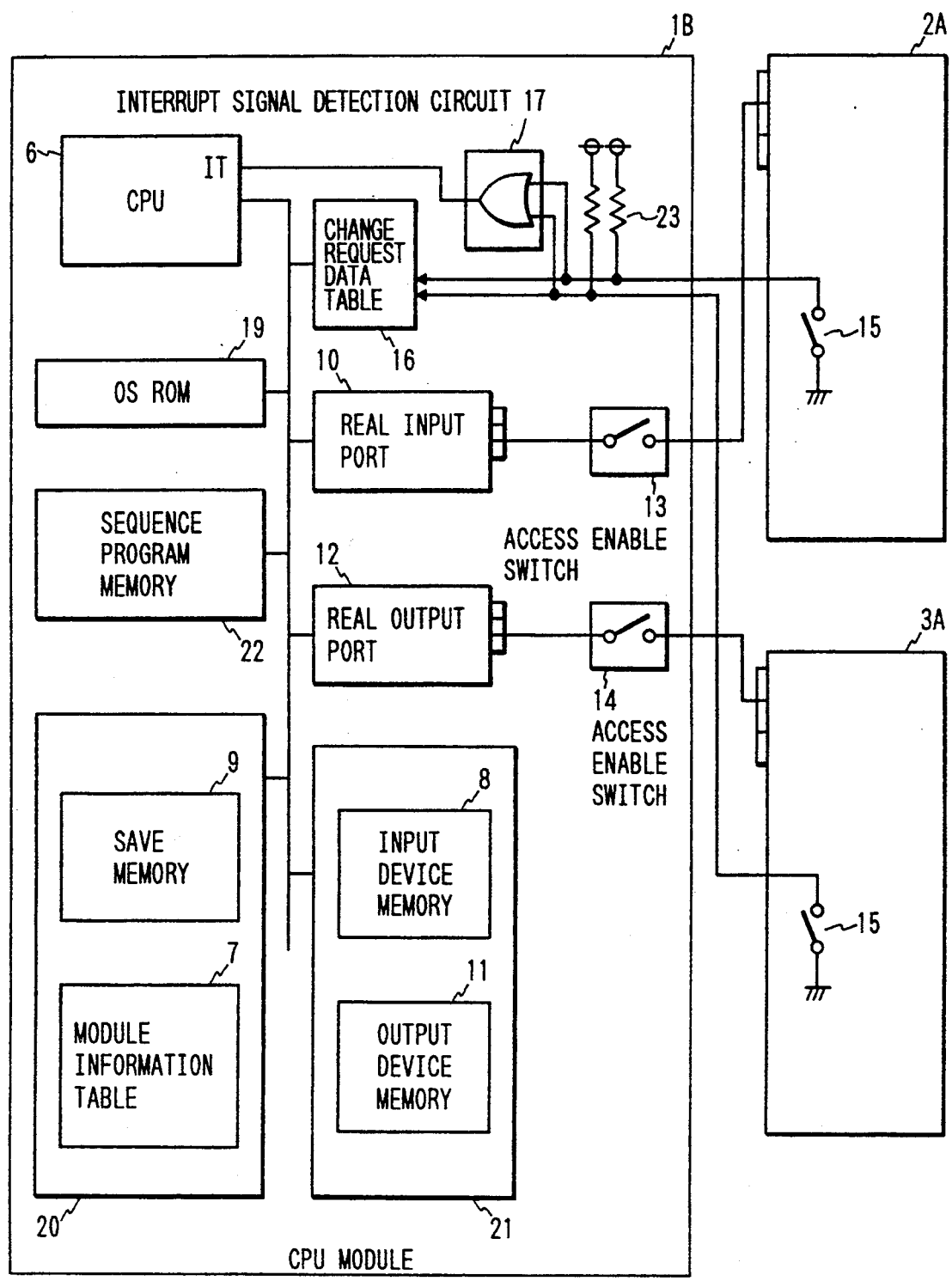
FIG. 5 is a block diagram illustrating the hardware arrangement of the programmable controller of the second embodiment.

The second embodiment of the invention will now be described with reference to FIG. 5 which illustrates a block diagram of the hardware arrangement of a CPU module 1B and I/O modules 2A and 3A. As shown in FIG. 5, the CPU module 1B includes an interrupt signal detection circuit 17 which functions to detect a module change request signal as an interrupt signal from each switch 15. As shown in FIG. 5, the interrupt detection circuit 17 may be an OR gate or other circuit element which performs the same function as an OR gate. Other than detection circuit 17, the programmable controller system configuration of the second embodiment is identical to that of the first embodiment shown in FIG. 1.

The operation of the second embodiment will now be described. When in the on-line mode, the CPU module 1B repeats sequence processing and end processing operations as in the first embodiment. Ordinarily, the module change request switches 15 in the input module 2A and the output module 3A are closed. The output module 3A is changed during the on-line mode, by first opening the switch 15 of the output module 3A. This causes the output module 3A to generate a module change request signal, which is supplied to the CPU 6, via the interrupt signal detection circuit 17. The CPU module 1B detects the module change request signal (i.e., a change from a "0" to a "1" in the interrupt signal) state from the output module 3A as the interrupt signal through the interrupt signal detection circuit 17. This change request signal interrupts operation of the CPU 6. This change request signal is also stored as data (i.e., as a "1") in the request table 16 at that address corresponding to the module that initiated the request.

When the CPU module 1B detects the interrupt request from the interrupt signal detection circuit 17, the CPU 6 stops control of the corresponding module. First, the CPU 6 examines the request table 16 to determine which I/O module generated the interrupt signal. Once the CPU 6 determines that the output module 3A generated the request signal, the CPU 6 stops operation of the output module 3A. The processing steps performed to stop the module 3A are identical to those steps in the processing flowchart of FIG. 3.

The corresponding output module 3A is thereafter removed. The interrupt signal is held at a "1", after the module is removed, by the corresponding pull-up resistor 23 in the interrupt signal detection circuit 17. Thereafter the replacement output module 3A (the change request switch 15 of which is placed in an opened state beforehand), is installed into the base. Next, the change request switch 15 is closed and normal control of the output module 3A is resumed. This causes the output module 3A to transmit a second request signal to the CPU module 1B (i.e., a "0" state).

When the interrupt signal detection circuit 17 detects that each request signal line has returned to a "0" (low) state, the interrupt signal detection circuit 17 sends a second interrupt request to the CPU 6 (i.e., the interrupt signal changes from a "1" to a "0" state). In response to the second interrupt request, the CPU 6 performs processing steps necessary to resume normal control of the output module 3A. These steps to resume normal control of the output module 3A are identical to the steps in the termination-time processing sequence of the first embodiment as shown in the flowchart of FIG. 4. While the above operation has been described in connection with the procedure for changing the output module 3A, the procedure for changing the input module 2A is similar to the above operation.

The interrupt signal detection circuit 17 is constructed to receive a high ("1") level on one of its inputs when the change request switch 15 of the I/O module is opened. Thereafter, the detection circuit 17 supplies an interrupt request to the CPU 6 when a change request signal from any module changes from a low state ("0") to a high state ("1"). When all of the change request signals are switched back to a low state, normal control of the corresponding module is resumed.

The first embodiment exclusively uses the data values in the request table 16 and the second embodiment exclusively uses interrupt request circuit 17 to control initiation of start-time and termination-time processing. However, the first and second embodiments can be combined, wherein the interrupt signal detection circuit 17 from the second embodiment is used to initiate change start-time processing and the request table data 16 from the first embodiment is used to initiate change termination-time processing. Such a "hybrid combination" of the first and second embodiments allows the CPU to detect when one module has been replaced and to resume normal control thereof, even if another module is still being replaced. For instance, if two modules initiate change requests, then the interrupt signal detection circuit 17 will maintain a high ("1") interrupt signal until both modules have been replaced and the corresponding request lines have changed to a low ("0") state.

In the second embodiment, the CPU will not perform change termination-time processing until the interrupt signal changes from a "1" state to a "0" state, which will not occur until the request signals from both modules return to a low state. Thus, the CPU will not resume normal control of either of the new modules until both modules have been replaced.

However, in the hybrid combination of the first and second embodiments, the change termination-time processing is initiated based on changes in the request table 16 data. Thus, when any module is replaced and the corresponding request table value is changed from a "1" to a "0" state, the CPU will resume normal control of that module, even if another removed module has not yet been replaced.

Figure 6:
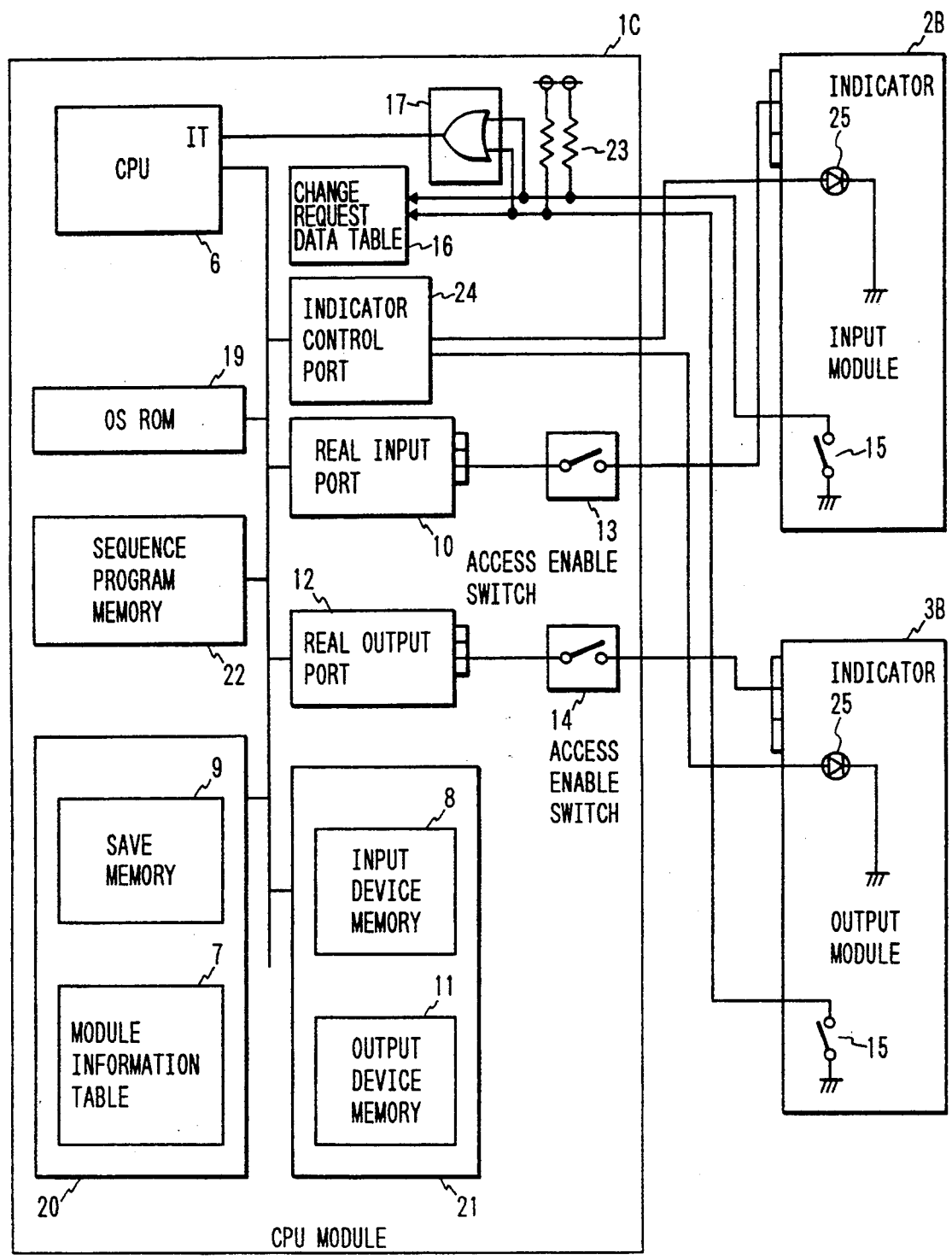
FIG. 6 is a block diagram illustrating the hardware arrangement of a programmable controller of the third embodiment.

A third embodiment of the invention will now be described in accordance with FIGS. 6–8. FIG. 6 illustrates a block diagram of the hardware arrangement of a CPU module 1C, an input module 2B and an output module 3B in a programmable controller. An indicator control port 24 acts as signalling means for outputting a module changeable state signal. The changeable state signals turn indicators 25 ON and OFF. Indicators 25, such as lights, illustrate which of the I/O modules 2B and 3B are in a changeable state. When the indicator 25 of a given module is OFF this indicates to the user that the CPU 6 has performed change start-time processing and that the module can be changed in the on-line mode.

Figure 7:
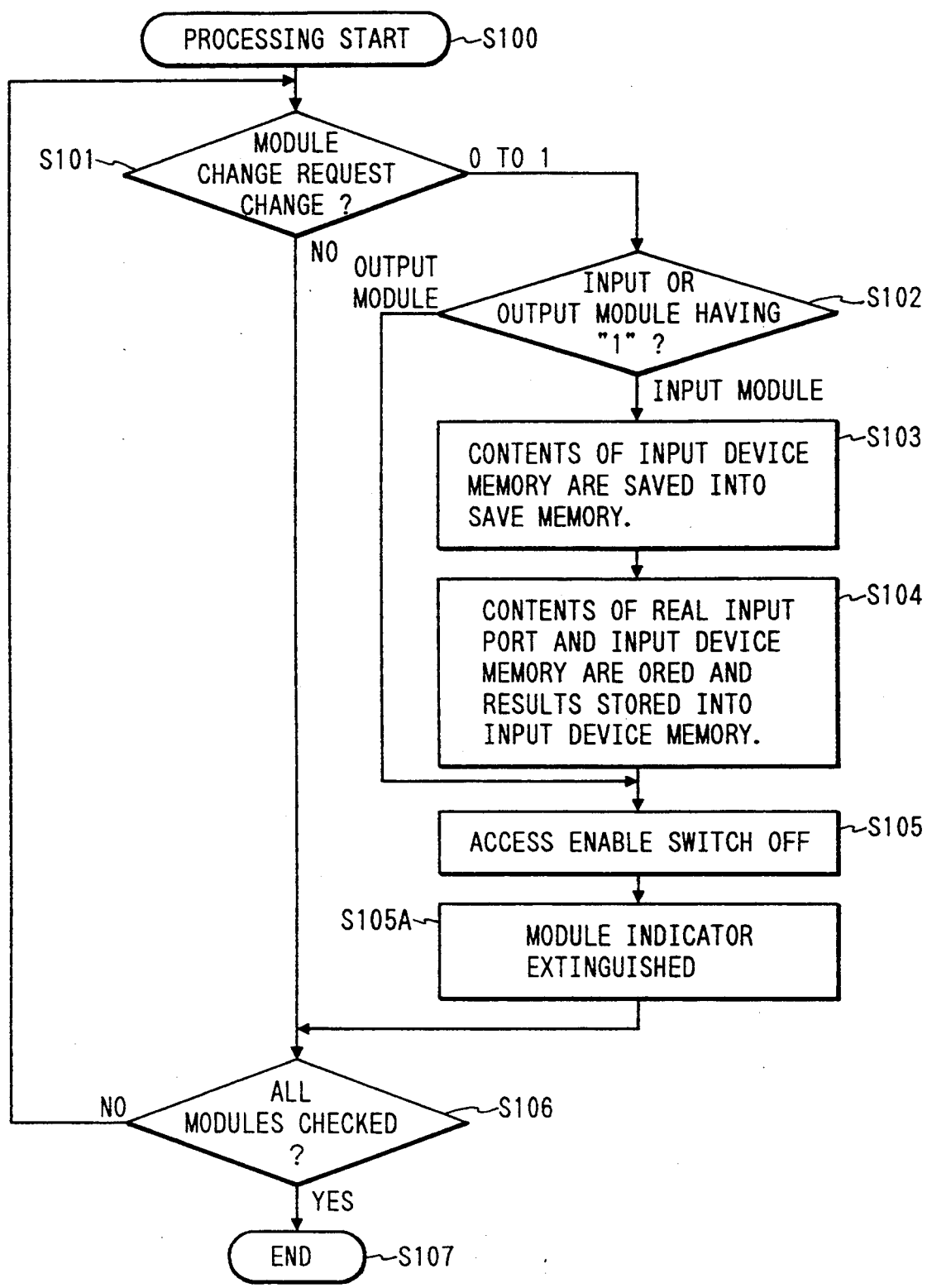
FIG. 7 is an I/O module change start-time processing flowchart for the programmable controller illustrated in FIG. 6.
Figure 8:
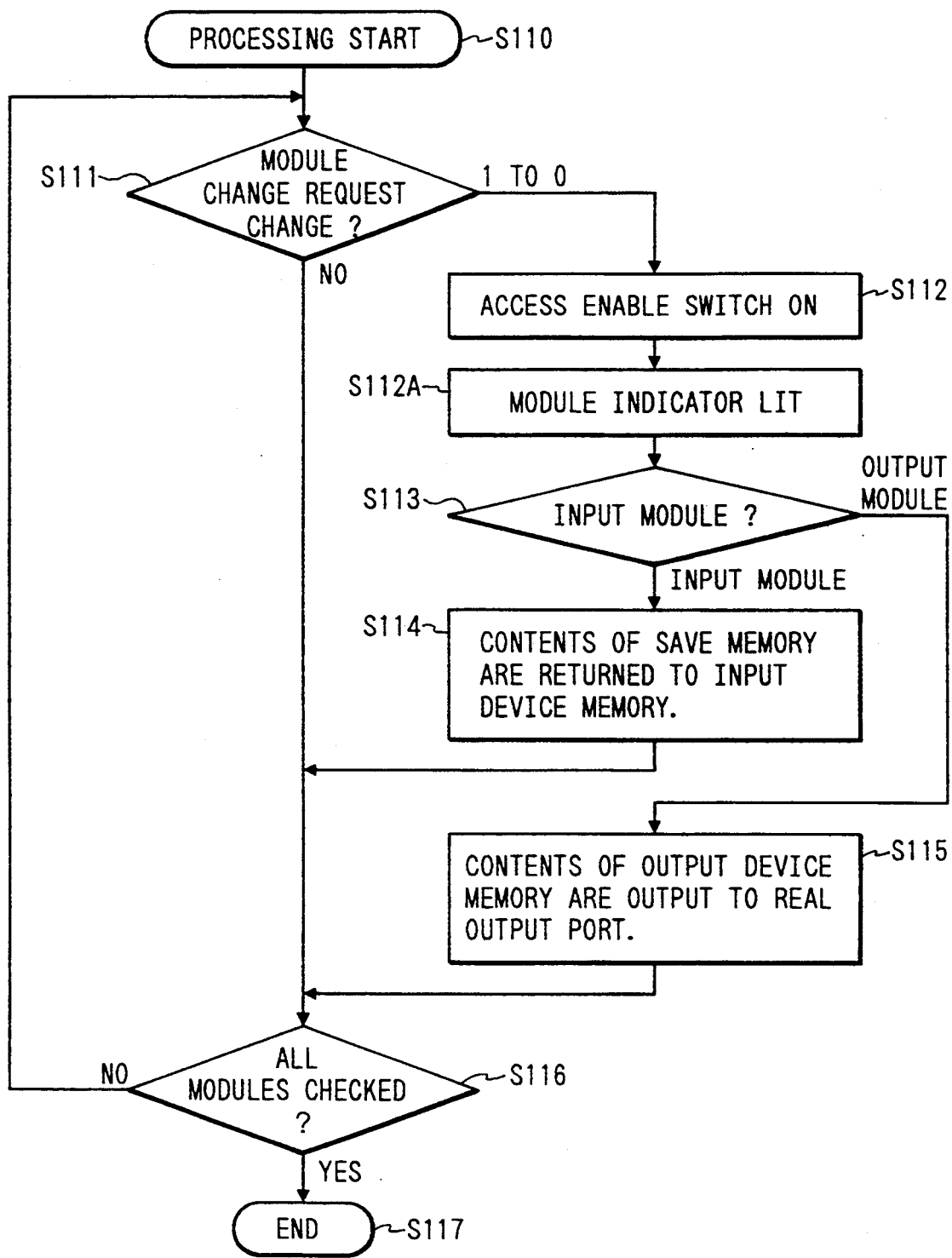
FIG. 8 is an I/O module change termination-time processing flowchart for the programmable controller illustrated in FIG. 6.
Figure 11:
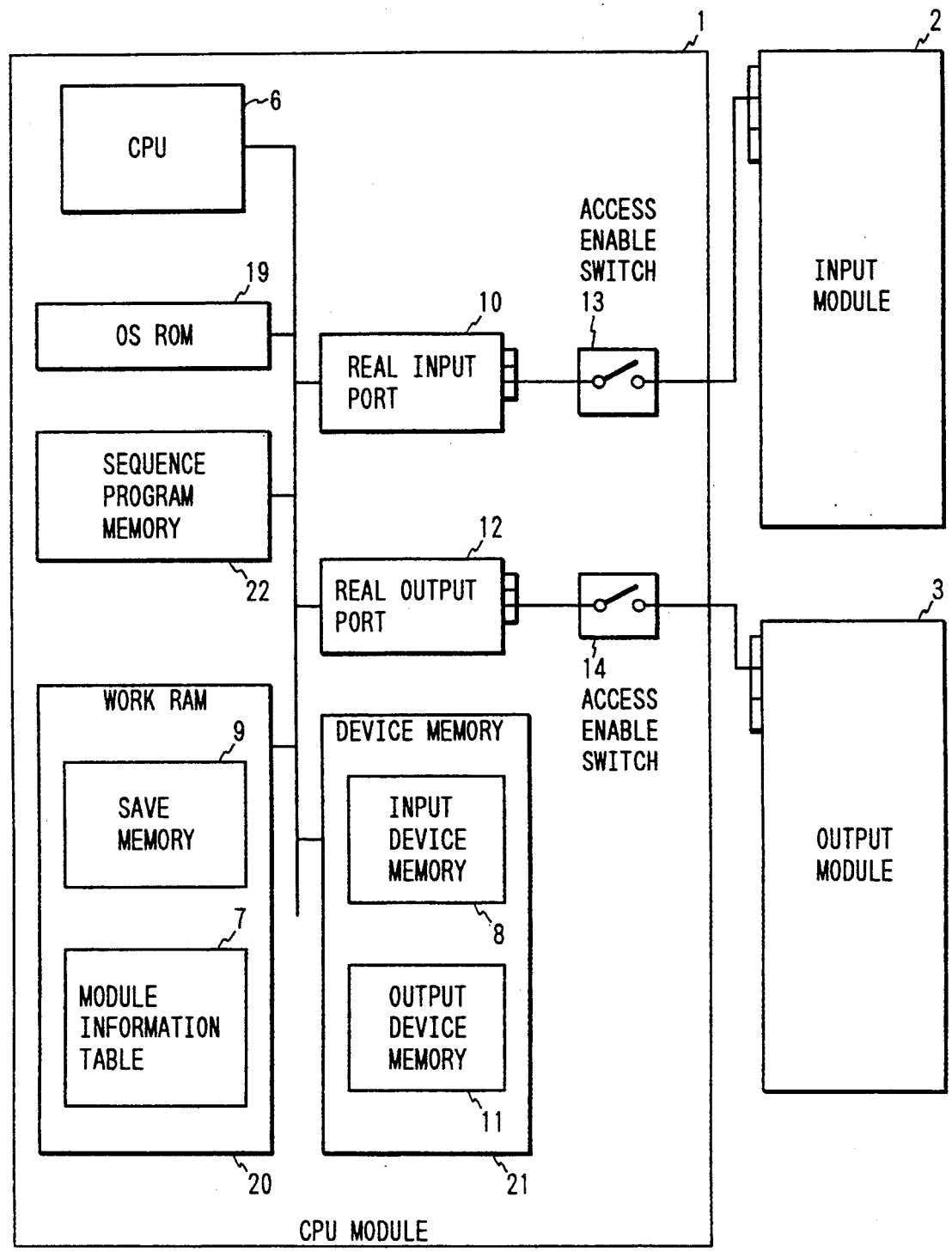
FIG. 11 is a block diagram illustrating the hardware arrangement of the conventional programmable controller of FIG. 10.
Figure 13:
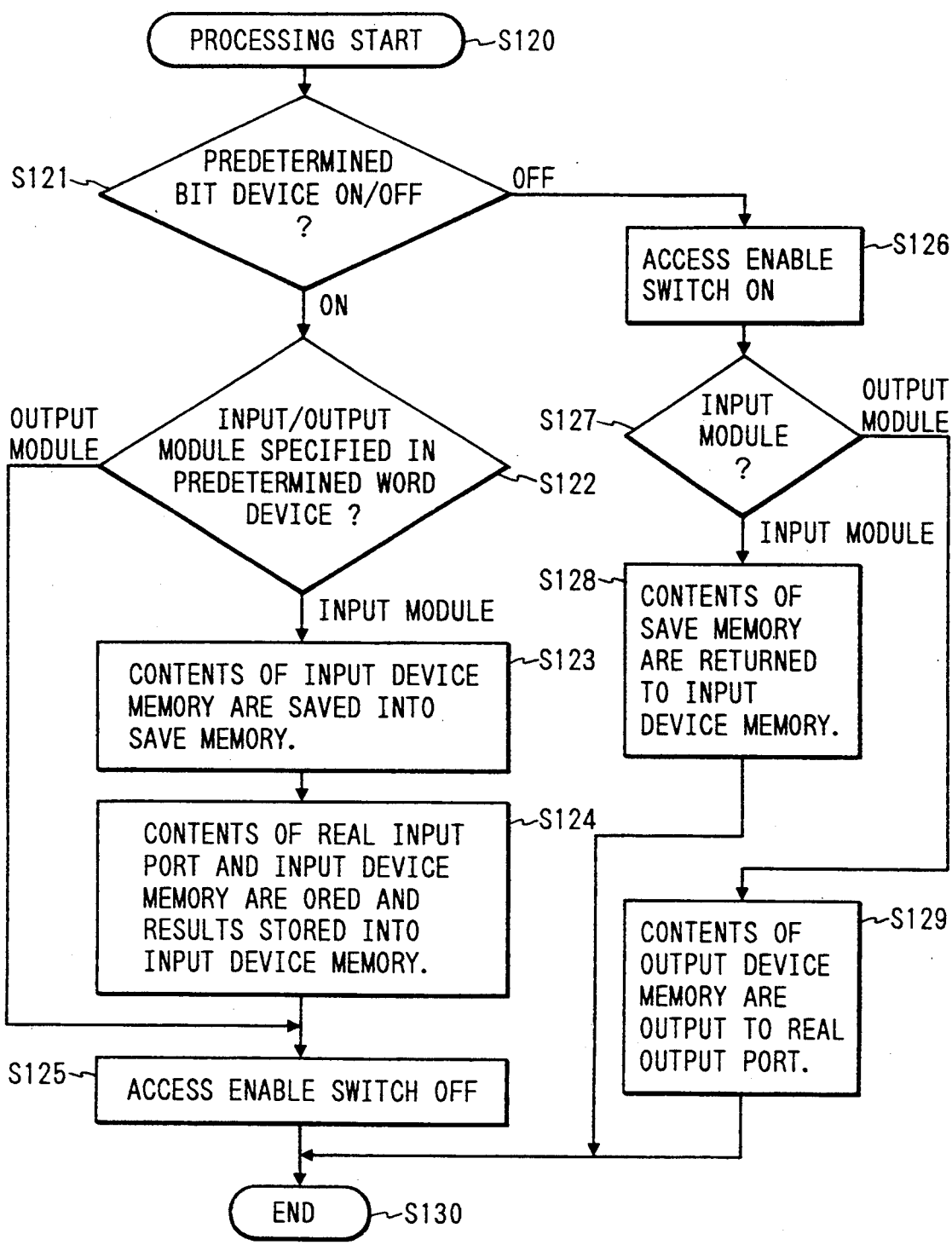
FIG. 13 is an I/O module change start-time and change termination-time processing flowchart in the on-line mode of a conventional programmable controller.

FIG. 7 illustrates a flowchart for the I/O modules change start-time processing while the programmable controller shown in FIG. 6 is in the on-line mode. FIG. 8 illustrates an I/O module change termination-time processing flowchart.

I/O module change start-time and termination-time procedures are similar to those of the first embodiment. However, the module change start-time flowchart for the third embodiment (FIG. 7) has a step S105A in addition to the steps in the flowchart of FIG. 3. Further, the module change termination-time flowchart (FIG. 8) includes a step S112A, in addition to the steps in the flowchart of FIG. 4. In the embodiment of FIG. 7, when a module is changed an access enable switch is turned OFF in step S105. Thereafter, a changeable state signal is sent to indicator 25, via the control port 24, corresponding to the module to be changed in step S105A.

In the third embodiment, an indicator control port 24 is switched to a low state to extinguish the corresponding indicator 25. In the module change termination-time processing (FIG. 8), the access enable switch (13 or 14) is turned ON in step S112 and an unchangeable state signal is then transmitted to the indicator control port corresponding to the module changed in step S112A. The control port 24 is then switched to a high state to enable or light up the indicator 25 of the corresponding module, which indicates that the module in not in a changeable state.

A fourth embodiment of the invention will be described in accordance with FIG. 9. This embodiment relates to a loading/unloading mechanism for optionally installing an input module 2B and an output module 3B on a base 4. As shown in FIG. 9, the loading/unloading mechanism includes an I/O module case 26 and a module loading/unloading portion 27. The module portion 27 includes a latch 27A for securing the I/O module case 26 to the base 4 in conjunction with a push spring 28 and a lever 27B for pushing against a switch 15 and turning it ON and OFF.

The operation of the loading/unloading mechanisms will now be described. By pushing down the lever 27B of the loading/unloading portion 27, the module case 26 can be loaded and unloaded to and from the base 4. When the lever 27B of the loading/unloading portion 27 is pushed down, the switch 15 is opened which provides an I/O module change request signal. On line change processing may be identical to those in the first to third embodiments.

Module case 26 is plugged into the base 4 and an electrical circuit is connected thereto. To remove the module case 26 from the base 4, the user pushes down on lever 27B of the loading/unloading portion 27, thereby turning the switch 15 to an open state from a normally closed state. The user then pulls the module case 26 out of the base 4, and disconnects the plug portion. The time required to initiate and complete the change start-time procedure, once the switch 15 is opened, ordinarily requires less than 0.1 seconds. This time period is shorter than the time required to manually remove the module case 26 from the base 4. Since the on-line module change processing in the CPU module is executed in an extremely short time after the module change request signal is output from the I/O module, the module change processing is completed between the point in time that the lever 27B is manually pushed down and the point in time when the I/O module is removed from the base. Thus the module can be accidentally loaded/unloaded in the on-line mode without adversely affecting the system.

This invention is not to be limited by the embodiments shown in the drawings and described in the description which are given by way of example and not of limitation.

What is claimed is:

1. A programmable controller for controlling peripheral devices comprising:
   a CPU module for controlling operation of the peripheral devices while in an on-line mode according to a sequence program stored therein, said CPU module repeatedly performing end processing while performing sequence processing based on said sequence program;
   an input module, connected between the CPU module and a first peripheral device, for inputting information signals from the first peripheral device to said CPU module; and
   an output module, connected between the CPU module and a second peripheral device, for outputting control signals from said CPU module to said second peripheral device,
   at least one of said input and output modules including a change requesting device for outputting a module change request signal to said CPU module during an on-line mode thereof,
   said CPU module comprising:
      a change request data table means for receiving and storing said module change request signals as request data, and
      change processing means for automatically placing one of said input and output modules in a changeable state in response to said request signals.

2. A programmable controller for controlling peripheral devices according to claim 1, wherein said change requesting device includes a switch for generating the change request signal when said switch is positioned in a first state.

3. A programmable controller for controlling peripheral devices according to claim 2, wherein said request table means includes a plurality of input lines, each of which corresponds to one of said input and output modules, said CPU module further comprises resistor means, connected to said input lines, for maintaining a request signal at a corresponding input line after a corresponding one of said input and output modules is removed.

4. A programmable controller for controlling peripheral devices according to claim 1, wherein said change processing means includes means for automatically reading said request data from said change request data table each time said CPU module performs said end processing and for determining that one of said input and output modules which has generated a request signal when a corresponding data value stored in said request data table means changes from a first state to a second state.

5. A programmable controller for controlling peripheral devices according to claim 4, wherein said change processing means includes means for identifying a module to be changed based on an address of said request data in said request table means.

6. A programmable controller for controlling peripheral devices according to claim 1, wherein said change processing means includes means for automatically determining that one of said input and output modules which has been replaced with a new module when the corresponding data stored in said request data table means changes from a second state to a first state.

7. A programmable controller for controlling peripheral devices according to claim 6, wherein said change processing means includes means for identifying said new module based on an address of said corresponding request data in said request table means.

8. A programmable controller as defined in claim 1, wherein the CPU module comprises signal outputting means for outputting a module changeable state signal to each input and output module, and each of said input and output modules comprises an indicator for indicating whether the corresponding module is in a changeable state based on said module changeable state signal.

9. A programmable controller as defined in claim 1, further comprising:
   a base unit containing a communications bus for interconnecting the CPU module with the input and output modules; and
   wherein at least one of the input and output modules includes a loading/unloading mechanism for releasably holding the corresponding input and output module in electrical connection with the base unit, said change requesting means including a switch that is opened and closed by an operation of said loading/unloading mechanism when the corresponding module is being loaded and unloaded.

10. A programmable controller for controlling peripheral devices comprising:
   a CPU module for controlling operation of said peripheral devices while in an on-line mode based on a sequence program, said CPU module performing end processing in response to an interrupt signal;
   an input module, connected between the CPU module and a first peripheral device, for inputting information signals from the first peripheral device to said CPU module; and
   an output module, connected between the CPU and a second peripheral device, for outputting control signals from said CPU module to said second peripheral device,
   at least one of said input and output modules including change requesting means for outputting a module change request signal to said CPU module during an on-line mode,
   said CPU module comprising:

interrupt signal detecting means for detecting the module change request signal and for generating said interrupt signal in response thereto, and change processing means for automatically performing end processing, in order to place one of said input and output modules in a changeable state in response to said interrupt signal.

11. A programmable controller as defined in claim 10, wherein the CPU module comprises signal outputting means for outputting a module changeable state signal to each input and output module, and each of said input and output modules comprises an indicator for indicating whether the corresponding module is in a changeable state based on said module changeable state signal.

12. A programmable controller as defined in claim 10, further comprising:

a base unit containing a communications bus for interconnecting the CPU module with the input and output modules; and wherein at least one of the input and output modules includes a loading/unloading mechanism for releasably holding the corresponding input and output module in electrical connection with the base unit, said change requesting means including a switch that is opened and closed by an operation of said loading/unloading mechanism when the corresponding module is being loaded and unloaded.

13. A programmable controller for controlling peripheral devices according to claim 1, wherein said change requesting device is responsive to an operator's request to produce said module change request signal irrespective of the status of said CPU.

14. A programmable controller for controlling peripheral devices according to claim 13, wherein said module change request signal is generated whenever at least one of said first and second peripheral units is removed and whenever an additional peripheral unit is added.

15. A programmable controller for controlling peripheral devices according to claim 14, wherein said CPU module includes change processing means responsive to said module change request signal for placing one of said input and output modules in a changeable mode, thereby allowing removal of one of said first and second peripheral units without interrupting the normal operation of said CPU.

* * * * *